US011400658B2

(12) United States Patent
Tang et al.

(10) Patent No.: US 11,400,658 B2
(45) Date of Patent: Aug. 2, 2022

(54) PROCESS FOR PREPARING CONSTRUCTION ARTICLES WITH CURED PRESSURE-SENSITIVE ADHESIVES

(71) Applicant: Firestone Building Products Company, LLC, Nashville, TN (US)

(72) Inventors: Jiansheng Tang, Westfield, IN (US); Carl E. Watkins, Jr., Mount Juliet, TN (US); Charles Harville, Sheffield, AL (US); Mark Wood, Indianapolis, IN (US); Joseph Carr, Indianapolis, IN (US)

(73) Assignee: Holcim Technology Ltd, Zug (CH)

( * ) Notice: Subject to any disclaimer, the term of this patent is extended or adjusted under 35 U.S.C. 154(b) by 0 days.

(21) Appl. No.: 17/211,132

(22) Filed: Mar. 24, 2021

(65) Prior Publication Data

US 2021/0237366 A1    Aug. 5, 2021

Related U.S. Application Data

(60) Division of application No. 16/887,422, filed on May 29, 2020, now abandoned, which is a continuation of
(Continued)

(51) Int. Cl.
*B29C 65/48* (2006.01)
*E04D 5/14* (2006.01)
(Continued)

(52) U.S. Cl.
CPC ...... *B29C 65/4845* (2013.01); *B29C 65/1406* (2013.01); *B29C 65/1496* (2013.01);
(Continued)

(58) Field of Classification Search
CPC ............ C09J 2301/416; B29C 65/1496; B29C 65/1406; B29C 65/4845
See application file for complete search history.

(56) References Cited

U.S. PATENT DOCUMENTS

2004/0111913 A1* 6/2004 Holmes ................ F26B 3/28
34/259
2004/0137222 A1  7/2004 Welke et al.
(Continued)

FOREIGN PATENT DOCUMENTS

WO       2015042258 A1    3/2015
WO    WO-2015042258 A1 *  3/2015    ............. C09J 7/385
(Continued)

OTHER PUBLICATIONS

International Search Report for related PCT/US2016/052471 dated Dec. 14, 2016.

*Primary Examiner* — Daniel McNnally
(74) *Attorney, Agent, or Firm* — Renner, Kenner; Arthur M. Reginelli

(57) ABSTRACT

An apparatus and related methods for constructing articles with cured pressure-sensitive adhesives comprising (i) a coater that applies a curable adhesive to a membrane; (ii) a cross-linking apparatus adapted to receive said membrane with said curable adhesive, said cross-linking apparatus comprising a light source positioned a first predetermined height above an aperture plate having an aperture therethrough, wherein said aperture plate is positioned a second predetermined height, said first predetermined height and said second predetermined height selected to define an exposure area of light emitted from said light source on to said curable adhesive to form a composite product; and (iii) a roll adapted to receive said composite product, said roll adapted to control a speed at which said membrane with said curable adhesive is exposed to light from said light source.

9 Claims, 3 Drawing Sheets

Related U.S. Application Data application No. 15/760,394, filed as application No. PCT/US2016/052471 on Sep. 19, 2016, now Pat. No. 10,688,730.

(60) Provisional application No. 62/220,631, filed on Sep. 18, 2015.

(51) Int. Cl.
| | |
|---|---|
| *C09J 7/38* | (2018.01) |
| *E04D 5/12* | (2006.01) |
| *B29C 65/14* | (2006.01) |
| *E04D 5/06* | (2006.01) |
| *E04D 5/08* | (2006.01) |
| *B29L 31/10* | (2006.01) |

(52) U.S. Cl.
CPC ............... *C09J 7/385* (2018.01); *E04D 5/06* (2013.01); *E04D 5/08* (2013.01); *E04D 5/12* (2013.01); *E04D 5/148* (2013.01); *B29L 2031/108* (2013.01); *C09J 2301/416* (2020.08)

(56) References Cited

U.S. PATENT DOCUMENTS

| | | | |
|---|---|---|---|
| 2007/0095011 A1* | 5/2007 | Khan | ...................... E04D 5/148 52/746.1 |
| 2016/0023039 A1 | 1/2016 | Cei | |

FOREIGN PATENT DOCUMENTS

| | | | |
|---|---|---|---|
| WO | 2016130636 | A1 | 8/2016 |
| WO | 2016145188 | A1 | 9/2016 |

* cited by examiner

PROCESS FOR PREPARING CONSTRUCTION ARTICLES WITH CURED PRESSURE-SENSITIVE ADHESIVES

This application is a divisional application of U.S. Ser. No. 16/887,422 filed on May 29, 2020, which is a continuation application of U.S. Ser. No. 15/760,394 filed on Mar. 15, 2018, which is a National-Stage application of PCT/US2016/052471 filed on Sep. 19, 2016, and claims the benefit of U.S. Provisional Application Ser. No. 62/220,631, filed on Sep. 18, 2015, which are incorporated herein by reference.

FIELD OF THE INVENTION

Embodiments of the invention are directed toward processes for the production of construction articles carrying a layer of cured pressure-sensitive adhesive.

BACKGROUND OF THE INVENTION

Large, flexible polymeric sheets, which are often referred to as membranes or panels, are used in the construction industry to cover flat or low-sloped roofs. These membranes provide protection to the roof from the environment, particularly in the form of a waterproof barrier. As is known in the art, commercially popular membranes include thermoset membranes such as those including cured EPDM (i.e., ethylene-propylene-diene terpolymer rubber) or thermoplastics such as TPO (i.e., thermoplastic olefins).

These membranes are typically delivered to a construction site in a bundled roll, transferred to the roof, and then unrolled and positioned. The sheets are then affixed to the building structure by employing varying techniques such as mechanical fastening, ballasting, and/or adhesively adhering the membrane to the roof. The roof substrate to which the membrane is secured may be one of a variety of materials depending on the installation site and structural concerns. For example, the surface may be a concrete, metal, or wood deck, it may include insulation or recover board, and/or it may include an existing membrane.

In addition to securing the membrane to the roof—which mode of attachment primarily seeks to prevent wind uplift—the individual membrane panels, together with flashing and other accessories, are positioned and adjoined to achieve a waterproof barrier on the roof. Typically, the edges of adjoining panels are overlapped, and these overlapping portions are adjoined to one another through a number of methods depending upon the membrane materials and exterior conditions. One approach involves providing adhesives or adhesive tapes between the overlapping portions, thereby creating a water resistant seal.

With respect to the former mode of attachment, which involves securing the membrane to the roof, the use of adhesives allow for the formation of a fully-adhered roofing system. In other words, a majority, if not all, of the membrane panel is secured to the roof substrate, as opposed to mechanical attachment methods that can only achieve direct attachment in those locations where a mechanical fastener actually affixes the membrane.

When adhesively securing a membrane to a roof, such as in the formation of a fully-adhered system, there are a few common methods employed. The first is known as contact bonding whereby technicians coat both the membrane and the substrate with an adhesive, and then mate the membrane to the substrate while the adhesive is only partially set. Because the volatile components (e.g., solvent) of the adhesives are flashed off prior to mating, good early (green) bond strength is developed.

Another mode of attachment is through the use of a pre-applied adhesive to the bottom surface of the membrane. In other words, prior to delivery of the membrane to the job site, an adhesive is applied to the bottom surface of the membrane. In order to allow the membrane to be rolled and shipped, a release film or member is applied to the surface of the adhesive. During installation of the membrane, the release member is removed, thereby exposing the pressure-sensitive adhesive, and the membrane can then be secured to the roofing surface without the need for the application of additional adhesives.

As is known in the art, the pre-applied adhesive can be applied to the surface of the membrane in the form of a hot-melt adhesive. For example, U.S. Publication No. 2004/0191508, which teaches peel-and-stick thermoplastic membranes, employs pressure-sensitive adhesive compositions comprising styrene-ethylene-butylene-styrene (SEBS), tackifying endblock resins such as coumarone-indene resin and tackifying midblock resins such as terpene resins. This publication also suggests other hot-melt adhesives such as butyl-based adhesives, EPDM-based adhesives, acrylic adhesives, styrene-butadiene adhesives, polyisobutylene adhesives, and ethylene vinyl acetate adhesives.

In view of the nature of the adhesives, peel-and-stick membranes have inherent limitations. For example, there are temperature windows that limit the minimum temperature at which the membranes can be installed on a roof surface. Also, there are maximum temperature limits on the roof surface that the adhesive can withstand while maintaining wind-uplift integrity. With respect to the latter, where the surface temperature on the roof nears the glass transition temperature of the adhesive, the adhesive strength offered by the pressure-sensitive adhesive is not maintained. As a result, peel-and-stick membranes have not gained wide acceptance in the industry. Moreover, the use of peel-and-stick membranes has been limited to use in conjunction with white membranes (e.g., white thermoplastic membranes) because the surface temperature of these membranes remains cooler when exposed to solar energy.

SUMMARY OF THE INVENTION

Embodiments of the present invention provide an apparatus for constructing articles with cured pressure-sensitive adhesives comprising (i) a coater that applies a curable adhesive to a membrane; (ii) a cross-linking apparatus adapted to receive said membrane with said curable adhesive, said cross-linking apparatus comprising a light source positioned a first predetermined height above an aperture plate having an aperture therethrough, wherein said aperture plate is positioned a second predetermined height, said first predetermined height and said second predetermined height selected to define an exposure area of light emitted from said light source on to said curable adhesive to form a composite product; and (iii) a roll adapted to receive said composite product, said roll adapted to control a speed at which said membrane with said curable adhesive is exposed to light from said light source.

Other embodiments of the present invention provide a method for constructing articles with cured pressure-sensitive adhesives, the method comprising (i) applying a curable adhesive on to one side of a membrane; (ii) feeding said membrane through a cross-linking apparatus having an exposure area; and (iii) obtaining said exposure area by selectively positioning at least one of a light source and an aperture plate having an aperture therethrough with respect to each other and said curable adhesive so that light emitted from said light source passes through said aperture to optimally cure said curable adhesive.

DETAILED DESCRIPTION OF ILLUSTRATIVE EMBODIMENTS

Embodiments of the invention are based, at least in part, on the discovery of a process for forming a construction article with a pressure-sensitive adhesive. These construction articles may be referred to as composites. The pressure-sensitive adhesive is advantageously applied to the article as a hot-melt adhesive and subsequently cured by radiation. The hot-melt adhesive is applied at relatively large thickness to provide an adhesive layer that has relatively high tack and sheer strength, which is required in the construction art. It has been observed that in order to cure these relatively thick adhesive layers, greater radiation intensity is required. Indeed, it has been observed that the thickness of the layer results in decay of the radiation, which correspondingly results in insufficient cure near the surface of the construction article (e.g., the interface between the adhesive and a membrane). As a result, the construction articles cannot be adhered to the desired substrate (e.g., roof) with the desired degree of adhesive strength. Simply increasing the intensity of the radiation, however, does not solve the problem. Instead, it has been observed that increased intensity results in the adhesive being exposed to greater radiation power, and this increased power has a deleterious impact on the adhesive. Namely, the upper surface of the adhesive becomes over cured, which impacts initial tack and overall adhesion. It has now been discovered that by controlling the radiation dosage (i.e. power) in conjunction with the radiation intensity, the adhesive can be cured to a useful level without realizing the deleterious impact of overdosing the radiation. In one or more embodiments, the power, and more particularly the intensity contributing to that power, is regulated by employing an aperture through which the radiation is passed.

Process Overview

Figure 1:
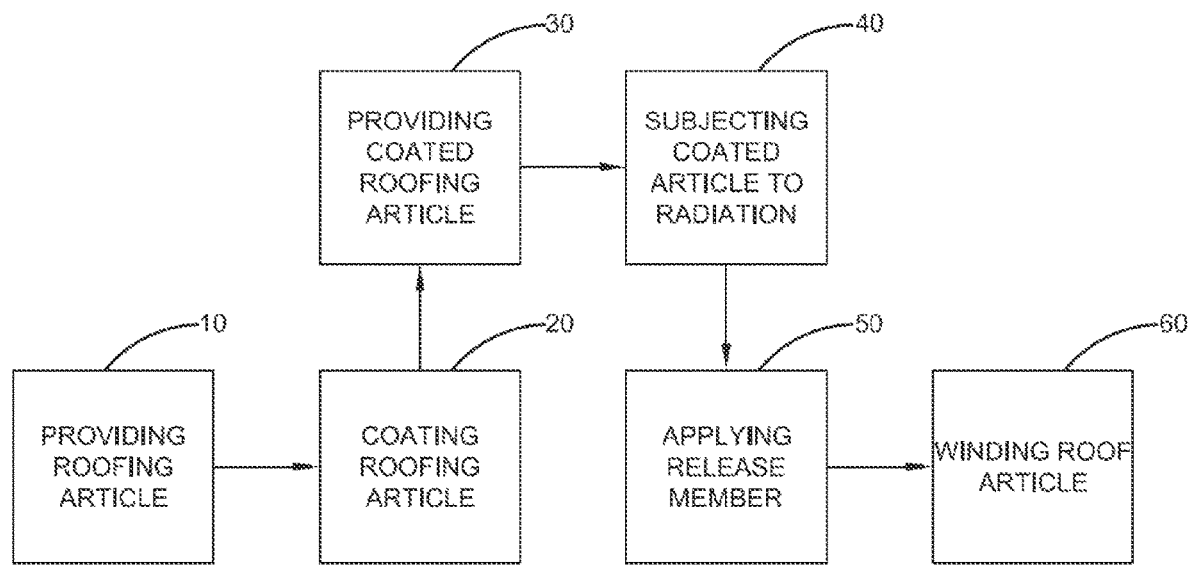
FIG. 1 is a flow chart describing a process for making a construction composite according to embodiments of the present invention.

In one or more embodiments, the process of the invention generally includes (i) providing a construction article with a coating of radiation-curable adhesive, and (ii) subjecting the coating to radiation, where the radiation power is maintained within a critical range and the radiation intensity contributing to that power is maintained above certain thresholds. The process of one or more embodiments can generally be described with reference to FIG. 1, which shows step 30 of providing a coated roofing article, and step 40 of subjecting the coated roofing article to radiation. In one or more embodiments, step 30 of providing a coated construction article may be preceded by step 10 of proving construction article and step 20 of coating the construction article with a radiation-curable adhesive. Also, after step 40 of subjecting the coated construction article to radiation, a release member may be applied in step 50 to the cured adhesive layer, and then the construction article may be wound within a winding step 60.

Providing Membrane with Curable Coating

In one or more embodiments, the construction articles of the present invention include roofing articles. The coated roofing articles may be referred to as roofing composites. In particular embodiments, the roofing articles are roofing membranes, which may also be referred to as membrane panels. The coated membranes may be referred to as membrane composites.

The membranes themselves may be prepared by conventional techniques. For example, thermoplastic membrane panels may be formed by the extrusion of thermoplastic compositions into one or more layers that can be laminated into a membrane panel. Thermoset membranes can be formed using known calendering and curing techniques. Alternatively, thermoset membranes can be made by continuous process such as those disclosed in WO 2013/142562, which is incorporated herein by reference.

In one or more embodiments, the membrane may be EPDM based. In other embodiments, the membrane may be TPO based. In these or other embodiments, the membrane may be flexible and capable of being rolled up for shipment. In these or other embodiments, the membrane may include fiber reinforcement, such as a scrim. In one or more embodiments, the membrane includes EPDM membranes including those that meet the specifications of the ASTM D-4637. In other embodiments, the membrane includes thermoplastic membranes including those that meet the specifications of ASTM D-6878-03. Still other membranes may include PVC, TPV, CSPE, and asphalt-based membranes.

In one or more embodiments, the roofing membrane panels are characterized by conventional dimensions. For example, in one or more embodiments, the membrane panels may have a thickness of from about 500 μm to about 3 mm, in other embodiments from about 1,000 μm to about 2.5 mm, and in other embodiments from about 1,500 μm to about 2 mm. In these or other embodiments, the membrane panels of the present invention are characterized by a width of about 1 m to about 20 m, in other embodiments from about 2 m to about 18 m, and in other embodiments from about 3 m to about 15 m.

As indicated above, the adhesive employed in the present invention is a curable hot-melt adhesive, which may also be referred to as a radiation-curable adhesive, a curable pressure-sensitive adhesive, or a pressure-sensitive adhesive. In one or more embodiments, the curable hot-melt adhesive may be an acrylic-based hot-melt adhesive. In one or more embodiments, the adhesive is a polyacrylate such as a polyacrylate elastomer. In one or more embodiments, useful polyacrylates include one or more units defined by the formula:

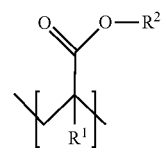

where each $R^1$ is individually hydrogen or a hydrocarbyl group and each $R^2$ is individually a hydrocarbyl group. In the case of a homopolymer, each $R^1$ and $R^2$, respectively, throughout the polymer are same in each unit. In the case of a copolymer, at least two different $R^1$ and/or two different $R^2$ are present in the polymer chain.

In one or more embodiments, hydrocarbyl groups include, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms. In particular embodiments, each $R^2$ is an alkyl group having at least 4 carbon atoms. In particular embodiments, $R^1$ is hydrogen and $R^2$ is selected from the group consisting of butyl, 2-ethylhexyl, and mixtures thereof.

In one or more embodiments, the polyacrylate elastomers that are useful as adhesives in the practice of this invention may be characterized by a glass transition temperature (Tg) of less than 0° C., in other embodiments less than −20° C., in other embodiments less than −30° C. In these or other embodiments, useful polyacrylates may be characterized by a Tg of from about −70 to about 0° C., in other embodiments from about −50 to about −10° C., and in other embodiments from about −40 to about −20° C.

In one or more embodiments, the polyacrylate elastomers that are useful as adhesives in the practice of this invention may be characterized by a weight average molecular weight of from about 100 to about 350 kg/mole, in other embodiments from about 150 to about 270 kg/mole, and in other embodiments from about 180 to about 250 kg/mole.

In one or more embodiments, the polyacrylate elastomers that are useful as adhesives in the practice of this invention may be characterized by a Brookfield viscosity at 150° C. of from about 20,000 to about 70,000 cps, in other embodiments from about 30,000 to about 60,000 cps, and in other embodiments from about 40,000 to about 50,000 cps.

Specific examples of polyacrylate elastomers that are useful as adhesives in the practice of the present invention include poly(butylacrylate), and poly(2-ethylhexylacryalte). These polyacrylate elastomers may be formulated with photoinitiators, solvents, plasticizers, and resins such as natural and hydrocarbon resins. The skilled person can readily formulate a desirable coating composition. Useful coating compositions are disclosed, for example, in U.S. Pat. Nos. 6,720,399, 6,753,079, 6,831,114, 6,881,442, and 6,887,917, which are incorporated herein by reference.

In other embodiments, the polyacrylate elastomers may include polymerized units that serve as photoinitiators. These units may derive from copolymerizable photoinitiators including acetophenone or benzophenone derivatives. These polyacrylate elastomers and the coating compositions formed therefrom are known as disclosed in U.S. Pat. Nos. 7,304,119 and 7,358,319, which are incorporated herein by reference.

Useful adhesive compositions are commercially available in the art. For example, useful adhesives include those available under the tradename acResin (BASF), those available under the tradename AroCure (Ashland Chemical), and NovaMeltRC (NovaMelt). In one or more embodiments, these hot-melt adhesives may be cured (i.e., crosslinked) by UV light.

As suggested above, the curable hot-melt adhesive is applied to a surface of the roofing article to form a coating layer of the curable adhesive. In one or more embodiments, the curable adhesive is heated and applied to one planar surface of the roofing article. For example, the curable adhesive is heated at or above a temperature at which the adhesive material flows, and then the adhesive is applied as a layer to a planar surface of, for example, a roofing membrane panel.

In one or more embodiments, coating step 20 includes heating the adhesive to a temperature of from about 120 to about 160° C., in other embodiments from about 125 to about 155° C., and in other embodiments from about 130 to about 150° C.

In one or more embodiments, coating step 20 applies an adhesive to the surface of a roofing article (e.g., membrane) to form a coating layer of adhesive that has a thickness of at least 51 μm (2 mil), in other embodiments at least 102 μm (4 mil), in other embodiments at least 114 μm (4.5 mil), in other embodiments at least 127 μm (5 mil), in other embodiments at least 132 μm (5.2 mil), in other embodiments at least 140 μm (5.5 mil), and in other embodiments at least 152 μm (6 mil). In one or more embodiments, coating step 34 applies an adhesive to the surface of a membrane to form a coating layer of adhesive that has a thickness of from about 51 to about 381 μm (about 2 to about 15 mil), in other embodiments from about 102 to about 305 μm (about 4 to about 12 mil), in other embodiments from about 114 to about 305 μm (about 4.5 to about 12 mil), in other embodiments from about 127 to about 254 μm (about 5 to about 10 mil), and in other embodiments from about 132 to about 254 μm (about 5.2 to about 10 mil). In one or more embodiments, the coating has a uniform thickness such that the thickness of the coating at any given point on the surface of the membrane does not vary by more than 51 μm (2 mil), in other embodiments by more than 38 μm (1.5 mil), and in other embodiments by more than 25 μm (1 mil).

In one or more embodiments, the curable hot-melt adhesive can be extruded onto the membrane by using known apparatus such as adhesive coaters.

Subjecting the Adhesive Coating to Radiation

As suggested above, the adhesive coating layer is cured by subjecting the curable adhesive layer to radiation within step 40. In one more embodiments, the curable adhesive layer is subjected to UV radiation. In one or more embodiments, the UV radiation is in the form of UV-C electromagnetic radiation, which can be characterized by a wave length of from about 220 to about 250 nm, or in other embodiments from about 250 to about 260 nm.

As indicated above, an advantageous cure state has been achieved by carefully regulating the power and intensity of the UV radiation imparted to the upper surface of the adhesive layer. In so doing, unexpected cure states have been achieved even though the adhesive layer is relatively thick. As suggested above, these cure states, among other benefits, are advantageously consistent throughout the thickness of the coating.

As suggested above, in practicing the present invention, the amount of radiation power (i.e., dosage) is maintained within critical ranges. Namely, in one or more embodiments, UV curing step 40 subjects the adhesive coating to a UV dosage (e.g., deriving from UVC radiation) of from about 75 to about 125 millijoule/cm$^2$, in other embodiments from about 80 to about 120 millijoule/cm$^2$, in other embodiments from about 85 to about 115 millijoule/cm$^2$, and in other embodiments from about 90 to about 110 millijoule/cm$^2$. In one or more embodiments, UV curing step 40 subjects the adhesive coating to a UV dosage (e.g., deriving from UVC radiation) of at least 75, in other embodiments at least 80, in other embodiments at least 85, and in other embodiments at least 90 millijoule/cm$^2$. In these or other embodiments, UV curing step 40 subjects the adhesive coating to a UV dosage (e.g., deriving from UVC radiation) of at most 125, in other embodiments at most 120, in other embodiments at most 115, and in other embodiments at most 110 millijoule/cm$^2$. It has been discovered that where the radiation dosage is below these prescribed ranges, insufficient cure, which leads to problems such as insufficient sheer strength in the adhesive, is obtained. On the other hand, where these ranges are exceeded, the dosage results in over curing of the adhesive, especially near the surface of the adhesive, which leads to, among other problems, insufficient tack.

As also suggested above, the advantageous level of cure achieved by practice of the present invention results from the intensity of the radiation (e.g., UVC radiation) contributing to the radiation dosage imparted to the upper surface of the adhesive layer. Namely, it has been unexpectedly discovered that threshold amounts of radiation (e.g., UVC radiation) of minimum intensities must be imparted to the upper surface of the adhesive layer. Stated another way, the requisite power dosage must be contributed by or derived from threshold amounts of radiation having minimum intensities. In one or more embodiments, at least 60%, in other embodiments at least 65%, in other embodiments at least 70%, in other embodiments at least 75%, in other embodiments at least 80%, and in other embodiments at least 85% of the radiation rays (e.g., rays of UVC radiation) giving rise to the requisite power must have an intensity of at least 200 milliWatts/cm$^2$. For example, in one or more embodiments, at least 60% of the UVC dosage imparted to the upper surface of the adhesive layer is contributed by or derived from UVC radiation having an intensity of at least 200 milliWatts/cm$^2$. In other embodiments, at least 55%, in other embodiments at least 60%, in other embodiments at least 65%, in other embodiments at least 70%, in other embodiments at least 75%, and in other embodiments at least 80% of UV radiation rays (e.g., rays of UVC radiation) giving rise to the requisite power must have an intensity of at least 250 milliWatts/cm$^2$. In other embodiments, at least 50%, in other embodiments at least 55%, in other embodiments at least 60%, in other embodiments at least 65%, in other embodiments at least 70%, and in other embodiments at least 75% of UV radiation rays (e.g., rays of UVC radiation) giving rise to the requisite power must have an intensity of at least 300 milliWatts/cm$^2$.

In one or more embodiments, the exposure time (i.e., the amount of time that the upper surface of the adhesive layer is subjected to the UV radiation) is less than 60 seconds, in other embodiments less than 50 seconds, in other embodiments less than 40 seconds, in other embodiments less than 35 seconds. In these or other embodiments, the exposure time is greater than 0.12 seconds, in other embodiments greater than 0.16 seconds, in other embodiments greater than 0.33 seconds, and in other embodiments greater than 0.5 seconds. In these or other embodiments, the exposure time is from about 0.12 to about 60 seconds, in other embodiments from about 0.16 seconds to about 50 seconds, and in other embodiments from about 0.33 to about 40 seconds.

In one or more embodiments, an exemplary process for preparing the membrane composites of the present invention can be described with reference to FIG. 2. Continuous process 150 includes a heating step 152 where UV curable hot-melt adhesive 151 is heated to a desired temperature within a heated tank 153. Adhesive 151 is fed into an extrusion device, such as a coater 155, which may include a pump, such as a gear pump 157, and a slot die 159. Within coating step 154, coater 155 extrudes adhesive 151, which is in its molten, liquid or flowable state, and deposits a coating layer 161 of adhesive 151 onto a planar surface 163 of membrane 165. The coating is applied in the thickness described above.

Figure 2:
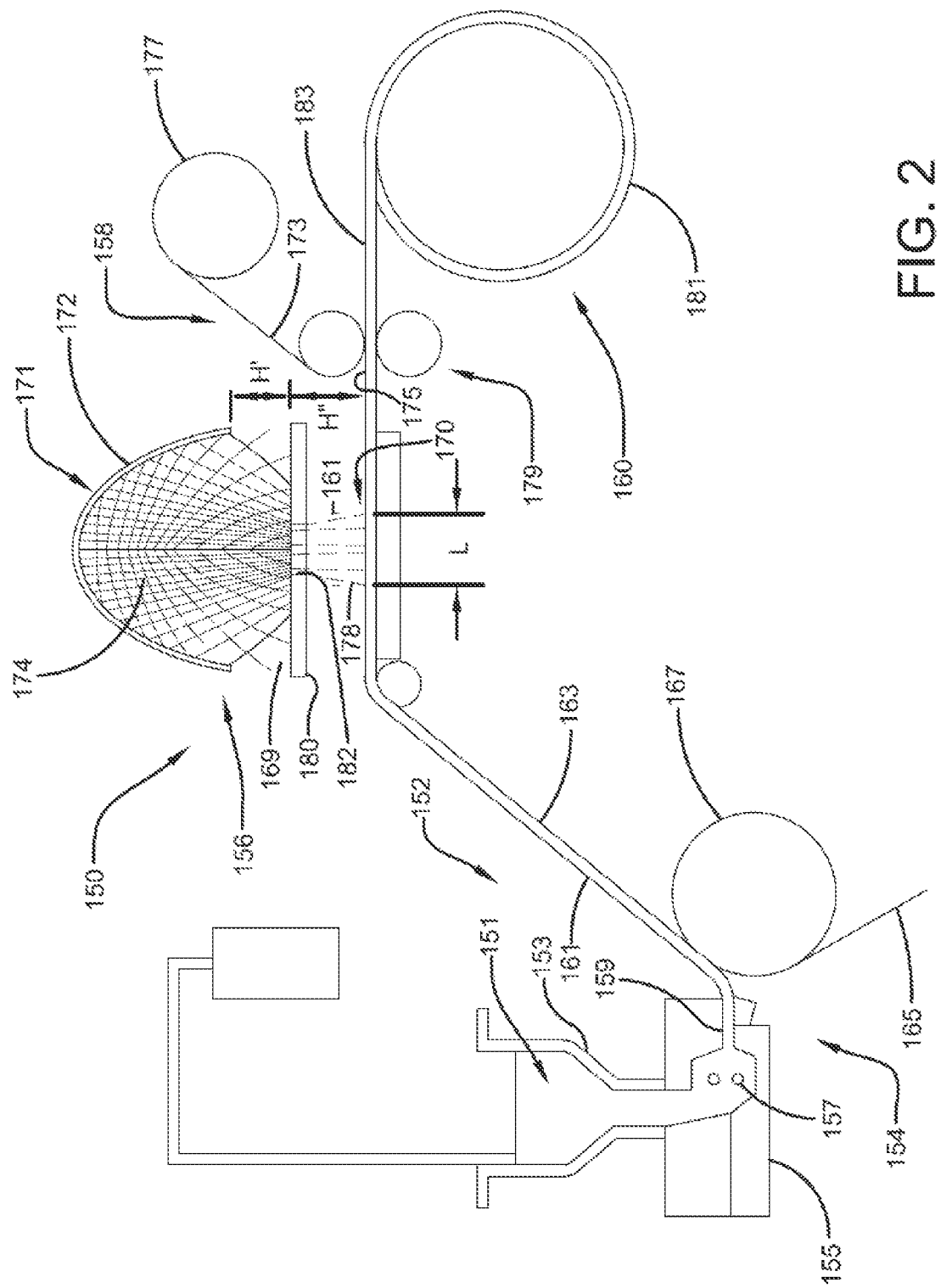
FIG. 2 is a schematic of a continuous process for making membrane composite according to the present invention.

As shown in FIG. 2, coating step 154 can include a roll-coating operation, where adhesive 151 is applied to membrane 165 while membrane 165 is at least partially wound around a coating mandrel 167. Membrane 165 carrying coating layer 161 is fed to a crosslinking step 156, where coating layer 161 of adhesive 151 is subjected to a desired dosage of UV radiation 169 (i.e., the intensity and exposure time detailed above). In one or more embodiments, UV radiation is supplied by one or more UV lamps 171. UV lamps 171 may include, for example, mercury-type UV lamps or LED UV lamps. As shown in FIG. 2, lamp 171 includes an elliptical reflector 172 and a light source 174.

As the skilled person appreciates, UV intensity can be manipulated by the power supplied to the respective lamps and the height of the lamps and/or reflectors are placed above the surface of coating 161 of adhesive 151.

The skilled person also appreciates that exposure time can be manipulated based upon the line speed and the exposure area. The line speed is the speed at which membrane 165 carrying coating layer 161 is passed under UV radiation 169. Line speed can simply be manipulated by adjusting the overall speed at which process 150 operates.

The exposure area is the area on the upper surface of the adhesive coating layer 161 that is subjected to UV radiation at any point in time. Generally, the exposure area is the product of the length and width of the pattern where UV radiation 169 contacts the upper surface of coating layer 161. For example, as can be gleaned from FIG. 2, the length (L) of exposure area 170 is shown. As a skilled person will appreciate, the exposure area, and more specifically a cross section of the exposure area taken in the machine direction, includes a focal point area and an area that is outside of the focal point area. In one or more embodiments, the exposure area can be defined with respect to the focal point area. More specifically, practice of one or more embodiments of the invention can be understood with reference to the ratio of the focal point area to the overall exposure area. In one or more embodiments, the ratio of the focal area to the overall exposure area is at most 1:5, in other embodiments at most 1:4, and in other embodiments at most 1:3.

As the skilled person appreciates, the exposure area and focal area can be manipulated by using numerous techniques. As shown in FIG. 2, exposure area 170 is manipulated, at least in part, by employing aperture plate 180, which includes aperture opening 182, and passing UV radiation 169 through aperture opening 182. In one or more embodiments, the width of aperture opening 182 is at least 1 cm, in other embodiments at least 2 cm, and in other embodiments at least 3 cm. In these or other embodiments, the width of aperture opening 182 is at most 6 cm, in other embodiments at most 5 cm, and in other embodiments at most 4 cm. In one or more embodiments, the width of aperture opening 182 is from about 1 cm to about 6 cm, in other embodiments from about 2 cm to about 5 cm, and in other embodiments from about 3 cm to about 4 cm.

Additionally, and as shown in FIG. 2, the height (H'+H") of reflector 172 relative to coating layer 161, the height (H') of reflector 172 relative to aperture plate 180, and the height (H") of aperture plate 180 relative to coating layer 161 can impact exposure area 178.

Following UV curing step 156, release member 173 may be applied to upper surface 175 of coating layer 161 within release member application step 158. As shown in FIG. 2, release member 173 may be supplied from a mandrel 177 and removably mated to upper surface 175 through pressure supplied by nip rolls 179. After application of release member 173, the composite product may be wound within winding step 160 to provide wound rolls 181 of composite products 183.

Composite Construction

Practice of the present invention does not necessarily change the overall construction of the membranes of the present invention. As the skilled person understands, membranes that carry an adhesive for application by peel-and-stick methods are generally known as disclosed in U.S. Publication No. 2004/0191508, which is incorporated herein by reference.

Figure 3:
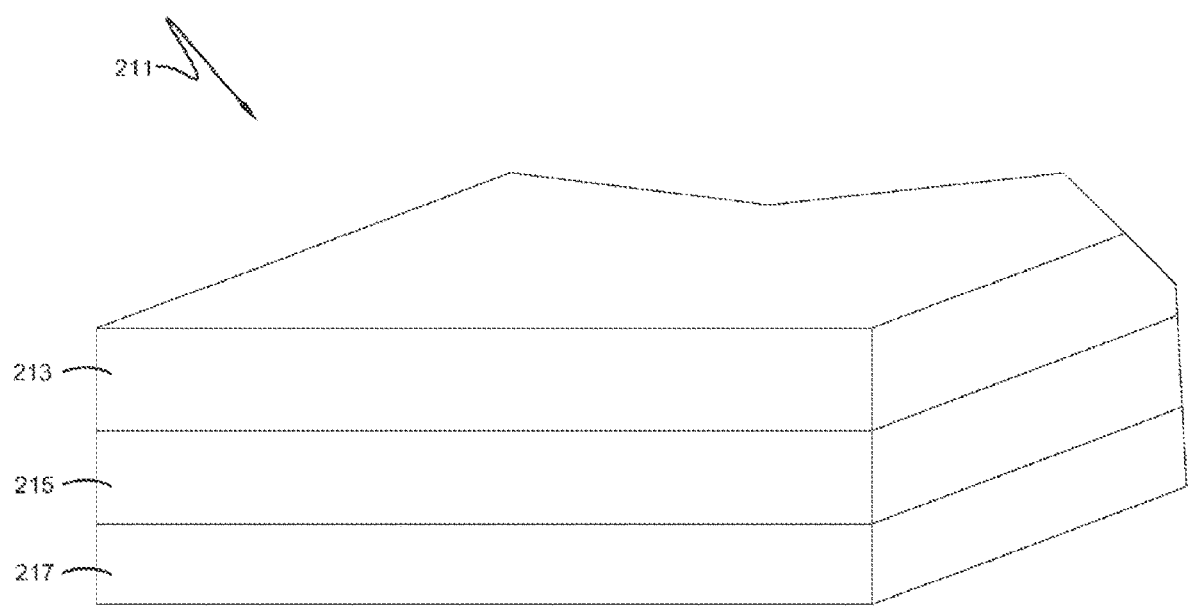
FIG. 3 is a cross-section perspective view of a membrane composite according to embodiments of the invention.

For example, a membrane 211, which may be referred to as a membrane composite 211, is shown in FIG. 3. Membrane composite 211 includes polymeric panel 213, pressure-sensitive adhesive layer 215, and release member 217 removably attached to layer 215.

In one or more embodiments, the adhesive is cured to an extent that it is not thermally processable in the form it was prior to cure. In these or other embodiments, the cured adhesive is characterized by a cross-linked infinite polymer network. While at least partially cured, the adhesive layer of one or more embodiments is essentially free of curative residue such as sulfur or sulfur crosslinks and/or phenolic compounds or phenolic-residue crosslinks.

In one or more embodiments, the pressure-sensitive adhesive layer may have a thickness of at least 51 µm (2 mil), in other embodiments at least 102 µm (4 mil), in other embodiments at least 127 µm (5 mil), and in other embodiments at least 152 µm (6 mil). In these or other embodiments, the pressure-sensitive adhesive layer has a thickness of at most 381 µm (15 mil), in other embodiments at most 305 µm (12 mil), and in other embodiments at most 254 µm (10 mil). In one or more embodiments, the adhesive layer has a thickness of from about 51 to about 381 µm (about 2 to about 15 mil), in other embodiments from about 102 to about 305 µm (about 4 to about 12 mil), and in other embodiments from about 127 to about 254 µm (about 5 to about 10 mil).

In one or more embodiments, release member 17 may include a polymeric film or extrudate, or in other embodiments it may include a cellulosic substrate. Where the polymeric film and/or cellulosic substrate cannot be readily removed after being attached to the asphaltic component, the polymeric film and/or cellulosic substrate can carry a coating or layer that allows the polymeric film and/or cellulosic substrate to be readily removed from the asphaltic component after attachment. This polymeric film or extrudate may include a single polymeric layer or may include two or more polymeric layers laminated or coextruded to one another.

Suitable materials for forming a release member that is a polymeric film or extrudate include polypropylene, polyester, high-density polyethylene, medium-density polyethylene, low-density polyethylene, polystyrene or high-impact polystyrene. The coating or layer applied to the film and/or cellulosic substrate may include a silicon-containing or fluorine-containing coating. For example, a silicone oil or polysiloxane may be applied as a coating. In other embodiments, hydrocarbon waxes may be applied as a coating. As the skilled person will appreciate, the coating, which may be referred to as a release coating, can be applied to both planar surfaces of the film and/or cellulosic substrate. In other embodiments, the release coating need only be applied to the planar surface of the film and/or cellulosic substrate that is ultimately removably mated with the asphaltic component.

In one or more embodiments, the release member is characterized by a thickness of from about 15 to about 80, in other embodiments from about 18 to about 75, and in other embodiments from about 20 to about 50 µm.

In one or more embodiments, the layer of crosslinked pressure-sensitive adhesive disposed on a surface of the membrane according to the present invention may be characterized by an advantageous peel strength. In one or more embodiments, the peel strength of the layer of crosslinked pressure-sensitive adhesive disposed on the membranes of the present invention may be characterized by a peel strength, as determined according to Pressure Sensitive Tape Council (PSTC) 101, of at least 3.0, in other embodiments at least 3.5, and in other embodiments at least 4.0. In these or other embodiments, the peel strength may be from about 3.0 to about 25 in other embodiments from about 3.5 to about 20, and in other embodiments from about 4.0 to about 18 psi.

In one or more embodiments, the layer of crosslinked pressure-sensitive adhesive disposed on a surface of the membrane according to the present invention may be characterized by an advantageous dead load shear. In one or more embodiments, the dead load shear of the layer of crosslinked pressure-sensitive adhesive disposed on the membranes of the present invention may be characterized by a dead load shear, as determined according to PSTC 107, of at least 0.5 hour (time of failure), in other embodiments at least 1.0 hour, and in other embodiments at least 1.5. In these or other embodiments, the dead load shear may be from about 2.0 to about 2.5 hours.

Application to a Roof Surface

The membrane composites of the present invention can advantageously be applied to a roof surface (also known as roof substrate) by using standard peel-and-stick techniques. For example, the membrane can be unrolled on a roof surface and placed into position. Portions of the membrane are then typically folded back and portions of the release member are removed. The membrane can then subsequently be adhered to the roof surface by using various techniques including the use of rollers and the like to mate the adhesive to the substrate. Where multiple membrane panels are employed, the seams can be secured by using conventional techniques. For example, thermoplastic membranes can be wielded together at the seam. Where thermoset membranes are employed, either liquid adhesives or tapes can be used to form a seam. It has advantageously been discovered that the pressure-sensitive adhesive layer employed in the membranes of the present invention allows the membranes to be adhered to a variety of roofing surfaces. These include, but are not limited to, wood decks, concrete decks, steel decks, faced construction boards, and existing membrane surfaces. In particular embodiments, the membranes of the present invention are adhered, through the cured adhesive layer disclosed herein, to a faced construction board such as, but not limited to, polyisocyanurate insulation boards or cover boards that include facers prepared from polar materials. For example, the adhesives of the present invention provide advantageous adhesion to facers that contain cellulosic materials and/or glass materials. It is believed that the polar nature of the adhesive is highly compatible with the polar nature of these facer materials and/or any adhesives or coatings that may be carried by glass or paper facers. Accordingly, embodiments of the present invention are directed toward a roof deck including a construction board having a cellulosic or glass facer and a membrane secured to the construction board through an at least partially cured polyacrylate adhesive layer in contact with a glass or cellulosic facer of the construction board.

Various modifications and alterations that do not depart from the scope and spirit of this invention will become apparent to those skilled in the art. This invention is not to be duly limited to the illustrative embodiments set forth herein.

What is claimed is:

1. A method for preparing a polymeric roofing membrane carrying a cured pressure-sensitive adhesive layer, the method comprising:
   (i) providing a polymeric membrane adapted to be used as a roofing membrane, where the membrane includes opposed planar surfaces;
   (ii) providing a UV-curable adhesive coating composition that forms a pressure-sensitive adhesive upon UV curing;
   (iii) applying the UV-curable adhesive coating composition to a planar surface of the polymeric membrane to thereby provide a membrane composite including a polymeric membrane with a layer of UV-curable adhesive coating composition disposed a planar surface of the membrane;
   (iv) providing a curing station adapted to impart UV light energy to a substrate by transmitting UV light from a light source through an aperture and onto an exposure area of the substrate, where the aperture regulates the passage of light energy to thereby control at least one dimension of the exposure area;
   (v) subjecting the layer of UV-curable adhesive coating composition disposed on said membrane to UV light energy within said curing station to thereby at least partially cure the UV-curable adhesive coating composition and form a layer of pressure-sensitive adhesive on said membrane; and
   (vi) applying a release member to the layer of pressure-sensitive adhesive, wherein the light source emits UV radiation rays, and wherein at least 60% of the UV radiation rays have an intensity of at least 200 milliWatts/cm$^2$.

2. The method according to claim 1, where said step of subjecting subjects the UV-curable adhesive to a UV dosage of from about 75 to about 125 millijoule/cm$^2$.

3. The method according to claim 2, wherein said exposure area is defined as a product of a length and a width of where light emitted from said light source contacts said curable adhesive.

4. The method according to claim 3, wherein said exposure area includes a focal point area, wherein a ratio of said focal point area to said exposure area is at most 1:5.

5. The method according to claim 1, where said step of applying the UV-curable adhesive coating composition to a planar surface of the polymeric membrane includes heating the UV-curable adhesive to thereby form a melted adhesive, and applying the melted adhesive to the membrane while the adhesive is in its molten state.

6. The method according to claim 5, wherein the UV-curable adhesive is heated to a temperature of from about 120 to about 160° C.

7. The method according to claim 1, where said step of subjecting exposes the layer of UV-curable adhesive to UV light energy for about 0.12 to about 50 seconds.

8. The method according to claim 1, wherein said step of applying the UV-curable adhesive forms a layer of adhesive having a thickness of at least 102 μm.

9. The method according to claim 1, further comprising the step of winding the membrane after the application of the release member on to said curable adhesive after passing through said exposure area.

* * * * *